INVENTORS
GILBERT SWIFT
ALTON D. CARPENTER
DAVID M. SMITH

BY
Russell E. Schroff
ATTORNEY

INVENTORS
GILBERT SWIFT
ALTON D. CARPENTER
DAVID M. SMITH
BY
*Russell E. Schloff*
ATTORNEY 3,427,877
DYNAMIC DEFLECTION DETERMINATION DEVICE
Gilbert Swift and Alton D. Carpenter, Houston, and David M. Smith, Austin, Tex., assignors to Dresser Industries, Inc., Dallas, Tex., a corporation of Delaware
Filed June 23, 1966, Ser. No. 559,931
U.S. Cl. 73—146          9 Claims
Int. Cl. G01m 7/00

ABSTRACT OF THE DISCLOSURE

An apparatus having the ability to traverse a highway sturcture or the like has a pair of counter-rotating weighted members for applying a cyclic force to the structure. A tiltable assembly allows the weighted members to commence rotating while in the horizontal position and then allows them to continue rotating after being tilted to the vertical position. Motion sensing devices are provided on the apparatus for detecting deflections of the structure resulting from the application of the cyclic force.

---

This invention relates to a dynamic deflection determination device for determining, while stationary, the elastic properties of materials forming a structure.

"Structure," as used throughout this application, shall mean any area formed of material and shall include natural terrain, various courses of roadways including the finished pavement, airstrips, bridges, foundations, dams, and the like.

In order to be able to determine the strength, durability, condition, and other features of a structure, it is necessary to first ascertain various properties and characteristics thereof. Some of these are the elastic properties, such as stiffness and flexure. Knowledge of such properties enable construction personnel to ascertain if the structure has been adequately compacted and to determine the load bearing capability and the durability thereof. In order to utilize such knowledge during the process of construction, it is highly desirable that the information necessary to ascertain the results be obtained in a fast and economical manner. It is also desirable to have a fast and economical means of surveying finished roadways to find substandard and defective remediable areas in order to permit timely repair.

At present, there are some processes of statically testing at specific locations along finished roadways to determine the strength thereof. However, there are no known methods presently available for rapidly and expeditiously performing such tests, except for the method and apparatus described in Gilbert Swift's copending application, Ser. No. 386,342, filed July 30, 1964. This present application is in some respects an improvement thereon.

The various stationary processes of determining elastic properties of a roadway, such as the Benkelman Beam Test and Plate Bearing Test are based on the principle of measuring displacement under a known force. In general, a known weight is placed on the surface of the structure and the amount of displacement resulting from such weight is measured. While such processes fulfill the need of providing a means for determining pavement deflection at any one location, the processes are time consuming.

The prior art processes of measuring deflection do not fulfill the need of providing a rapid and convenient process for making a survey of the roadway from which probable areas of substandard construction may be easily determined. Being able to locate such areas would permit remedial action prior to serious deterioration. Due to the fact that prior art processes are time consuming, they are used mainly for research rather than as a construction maintenance aid on a day-to-day basis. Therefore, there was a need for a method of expeditiously surveying the elastic properties of a structure to permit overall evaluation of the structure as an aid in maintenance and such was provided by the aforementioned Swift invention.

The aforementioned Swift invention comprises impressing on the structure being tested a cyclic repetitive force and determining a characteristic of the deflections resulting therefrom. The deflections may be determined either just adjacent to the point of application of the force or at multiple positions spaced in fixed relation to the force.

The applied force is deemed constant although varying repetitively from a constant minimum to a constant maximum magnitude. Accordingly, it is only necessary to measure the amplitude of the resulting deflections to determine the stiffness or compliance of the structure.

One form of apparatus for performing the aforementioned Swift invention was comprised of a force generating means which provided a cyclic downward force, coupling means for mechanically coupling such force to the structure being tested and instrumentation for determining the resulting deflection.

The force generating means was formed by rotating two masses synchronously in opposite directions in a vertical plane. The masses were arranged with respect to a mechanical coupling member so as to produce a cyclic variation of the downward force exerted by the mechanical coupling member on the surface of the structure being tested. The device was so designed with respect to the force generated by the rotatable masses that there was always a downward force acting against the surface, avoiding any negative force during the entire cycle of the rotating masses. The material of the structure being tested yielded and returned to its original configuration in synchronism with repetitive force there against.

One or more motion sensing devices were provided to sense the deflections either adjacent the point of force application or at several spaced positions. Further, appropriate instrumentation was provided to determine amplitude of the vertical oscillatory motion.

In order to enhance the commercialization of the aforementioned Swift invention, it was found desirable to incorporate several changes in the apparatus described in the aforementioned Swift application to improve its operation from the operator's standpoint. These changes required modifications which in some respects are an improvement upon the dynamic deflection determination device disclosed in such applicaton.

One of the changes was to centralize nearly all of the controls for the device near the driver's seat in the towing vehicle so that once the device has been adjusted for the day, the operator can travel to the structure to be tested and make numerous tests without actually leaving the driver's seat. In order to accomplish this, certain changes had to be effected. For example, it was necessary to provide a different type of suspension for the force applying means. The present invention utilizes a tiltable frame which contains the force applying means. By means of electro-hydraulic power, this frame can be tilted from a horizontal roadway position to a substantially vertical operating position by controls from the driver's seat. It was found that by utilizing a pair of wheels to mechanically couple the force generator to the structure that the force applying means was stable and it was therefore possible to lift the road trailer from contact with the structure. These two mechanical coupling wheels then support the force applying means without requiring intricate connection between the towing vehicle and the road trailer containing the force applying apparatus. By utilizing a pair of mechanical coupling wheels, it was found that a motion sensing device could be placed in between such wheels to get a more accurate determination of deflection closer to the point of application of the force.

It was found that by having the force generator in a horizontal position prior to the operation, it was possible to start the rotating flywheels with a minimum of torque which is considerably less than would be required if such flywheels were started while in a vertical position. Once started, it was possible to continue the rotation of the force wheels with a minimum of power. Thus, a relatively small electric motor suffices for driving the flywheels. Reducing power requirements for the force generator, the use of proper interlocks and transistorizing the instrumentation has made it possible to operate the dynamic deflection determination device on the 12 volt DC provided by the existing battery system of the towing vehicle.

In order to make it possible to operate the device primarily from the driver's seat in the towing vehicle, it was necessary to raise and lower the motion sensing devices by remote control means which are located near the driver's seat of the towing vehicle. Accordingly, the motion sensing devices were suspended from a member attached to the tow-bar of the trailer and the member raised and lowered, which action brings the motion sensing devices into and out of contact with the surface of the structure being tested.

With these improvements, it is possible to rapidly make static tests at a number of specific locations along a structure. When the towing vehicle arrives at the structure to be tested, the force generator is started and the force applying means is moved from its horizontal position to a vertical position. As previously mentioned, power requirements for the force generator are greatly reduced when the force generator is started in a horizontal position, and therefore interlocks are provided to prohibit starting of the force generator in any other position. The tilting of the force applying means to a vertical position lifts the road wheels of the trailer from the surface of the structure and couples the force generator to the structure. After the force generator has been coupled to the structure, the motion sensing devices are lowered into contact with the structure and readings are then taken. If a further test is desired within a fairly short distance after the readings are taken, it is possible to raise the motion sensing devices leaving the force applying means in its operating position. The towing vehicle and the dynamic deflection determination device riding on the pair of mechanical coupling wheels is then moved to the new location, at which time the motion sensing devices are again lowered and another test is conducted. In this way, it is possible to expeditiously make numerous tests of an area. After the tests in a particular area have been completed, the force applying means is tilted back to its horizontal position, lowering the road wheels of the trailer, and the device moved to a new location.

It is an object of the present invention to provide a device for testing the deflection of a structure under a cyclic applied force, which device may be expeditiously moved from a roadway position into an operating position, all of which may be controlled primarily from the driver's seat in the towing vehicle.

It is a further object to provide a dynamic deflection determination device in which the force applying means is tiltably mounted on a roadway trailer, the force applying means being in a horizontal position in the roadway condition and moved to a substantially vertical operating position by electro-hydraulic means which are controlled from the driver's seat of the towing vehicle. The tilting action of the force applying means raises the road wheels of the trailer from contact with the surface of the structure.

It is a further object to provide a dynamic deflection determination device having a pair of force coupling members which act as a stabilizer for the force applying means when the device is in an operating condition.

It is still a further object to provide a dynamic deflection determination device which is provided with an array of motion sensing devices which can be raised and lowered into contact with the surface by remote control means.

The novel features which are believed to be characteristic of the invention, both as to its organization and method of operation together with further objects and advantages thereof, will be better understood in connection with the accompanying drawings in which a presently preferred embodiment of the invention is illustrated by way of example. It is to be understood, however, that the drawings are for the purpose of illustations and description only, and are not intended as a definition of the limits of the invention.

Figure 1:
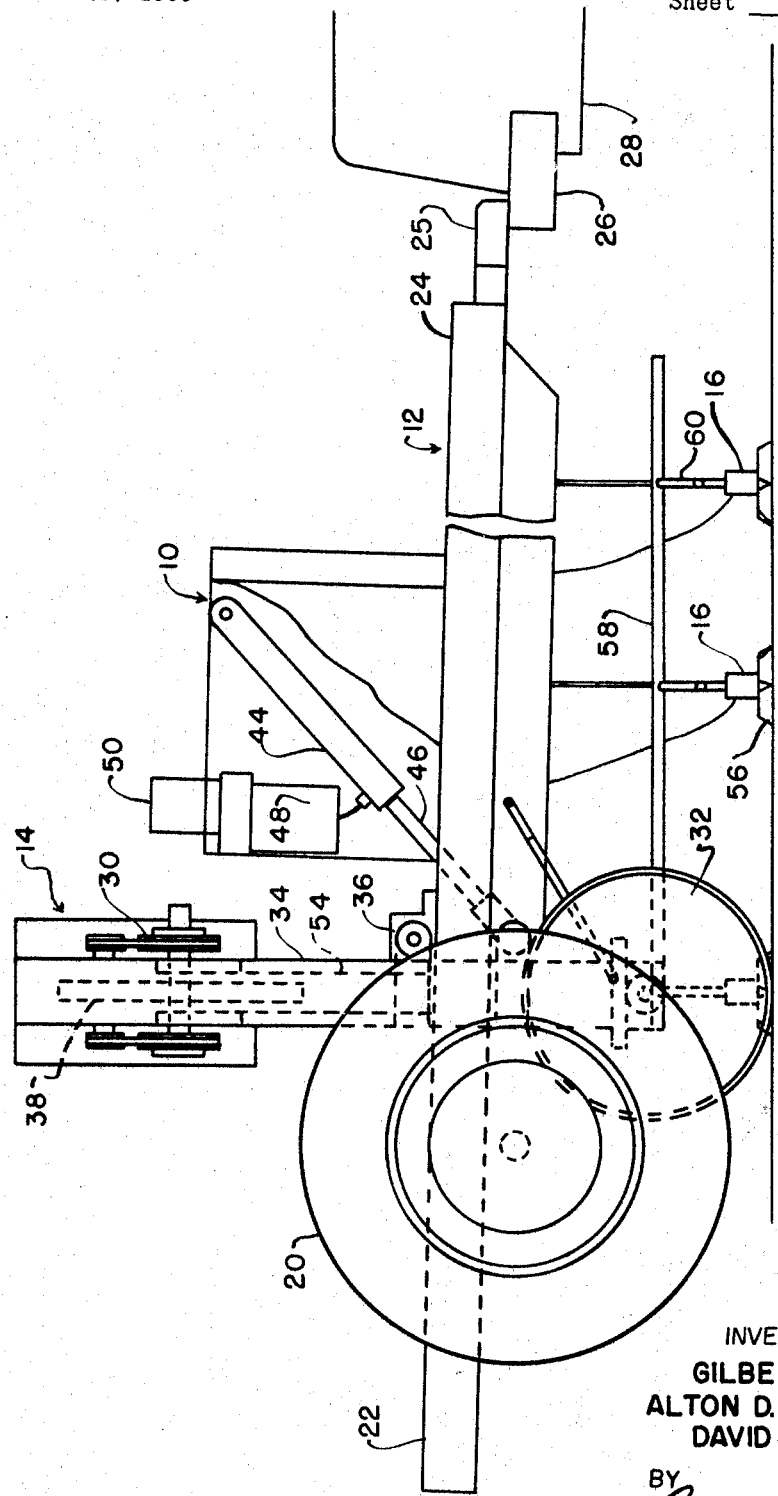
FIGURE 1 is a diagrammatic view in elevation of the apparatus of the present invention showing the dynamic deflection determination device attached to the rear of the towing vehicle.
Figure 2:
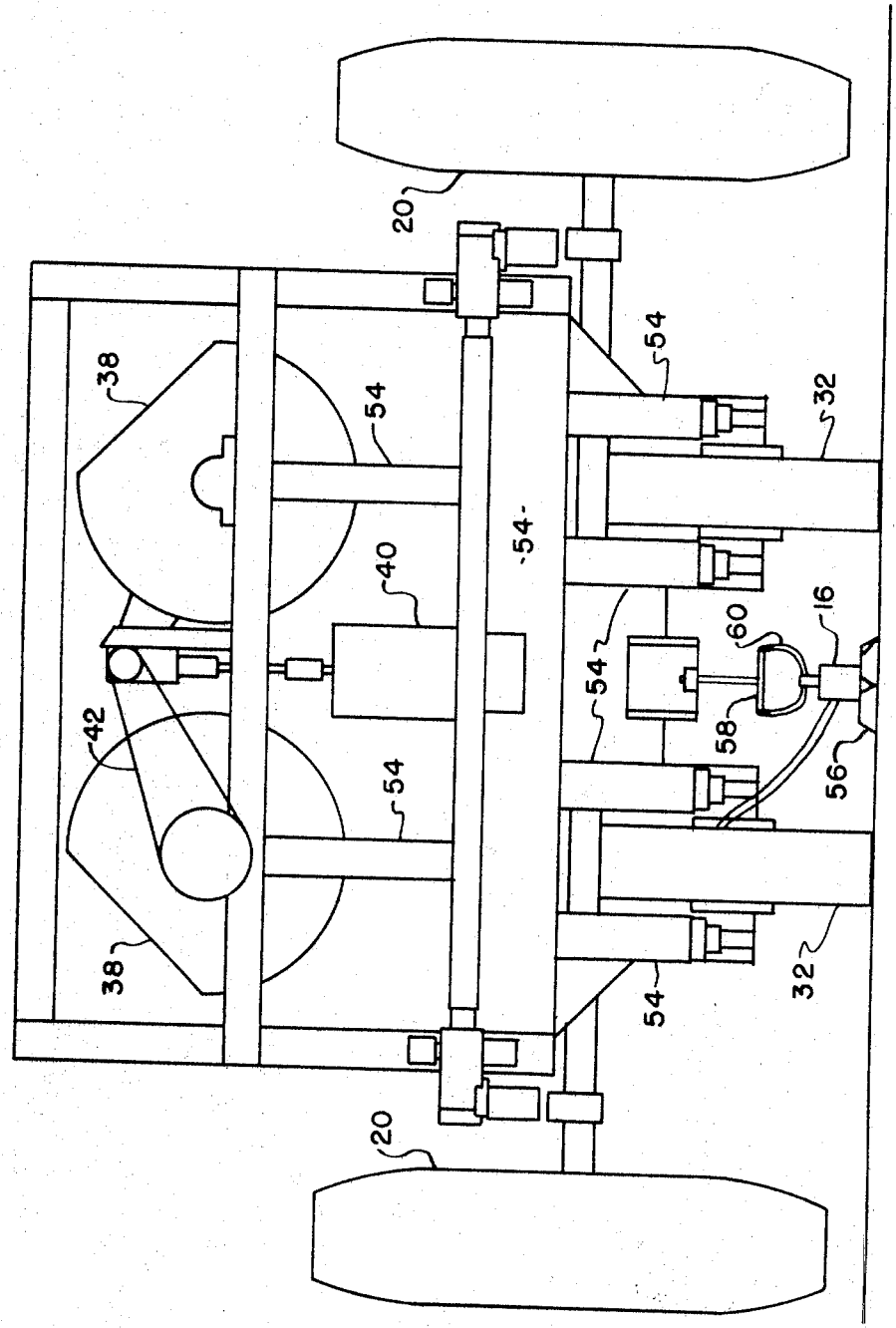
FIGURE 2 is a diagrammatic rear view of the device shown in FIGURE 1.

The present invention is based on the principles fully set forth in the aforementioned Swift application, i.e., that the application of a cyclic repetitive force will produce synchronous deflections of the material against which the force is applied. The amplitude of the deflections will depend upon the elastic properties of the structure under test. In general, the amplitude of the deflections will be greatest at the point of application of the force and will distances from the point of application of a given force. may deflect either alike or differently at various specific distances from the point of application of a given force. While some structures may deflect alike at one specific distance, these same structures may deflect quite differently at another specific distance from the point of application. Accordingly, structures may be classified according to the amount of deflection at a chosen spot relative to the point of application of the force and also may be classified on the basis of variation of deflection relative to distance from the point of application of the force.

The operation of the present invention in its broad aspects comprises applying a cyclic repetitive force to the structure under test and determining the synchronous deflections resulting therefrom.

The first step is the application of a cyclic repetitive force to the structure under test. Since the invention is directed primarily to performing non-destructive type tests on structures in the construction field, it is desirable that the maximum load applied to the structure be of such a magnitude as not to damage or appreciably alter the structure. However, on the other hand, it is desirable that the minimum load be of such a magnitude so that the force applying assembly will not tend to lose contact with the structure during its cyclic operation. Within such limits, the cyclic repetitive force may be of any desired magnitude. It is also preferable that the force be applied substantially normal to the plane of the structure and that the cyclic force be of a single frequency.

The deflection of a structure is substantially proportional to the force applied, therefore permitting, through calculations, to relate a resulting deflection to any applied force. However, it is preferable to have the force remain constant thereby not depending upon the above premise and eliminating the necessity of the innumerable calculations which would be required if applied force changed during testing. If the force remains constant, it is unnecessary to take into consideration the force and a determination of resulting deflections reflect the elastic properties of the structure being tested. Therefore, it is desirable to have the force operate at a definite cyclic repetitive rate which does not change during the operation. Also, it is desirable that the mass used in producing the force does not vary and that the distance through which the mass moves in producing the force remains constant.

Having a constant force applied to the structure permits being concerned only with the resulting deflection and eliminates having to calculate the variation in force. However, it is desirable that the magnitude of applied force be known to provide a basis for extrapolation of the data obtained. Such extrapolation permits determination of the probable deflection from greater forces and also permits determination of the maximum force which the structure can maintain. To perform such extrapolation, it is essential that the applied force be known and that it remain constant during testing operations.

It is also necessary that the applied force is mechanically coupled to the structure under test so that substantially all of the force being generated is actually applied to the structure.

It has been found that most structures in the construction field have a natural resonance such that if the frequency of the applied force is less than ten cycles per second, the resulting deflection is principally due to compliant reactance rather than mass reactance. Therefore, if the frequency of application is less than ten cycles per second, the mass does not have to be taken into consideration in the interpretation of the deflection. It has been found that by using such frequencies the results more truly reflect the elastic properties of the structure. Also, such frequencies more closely resemble the type of force to which such structures are normally subjected. It has also been found that by using a frequency of less than ten cycles per second that the resulting deflections compare favorably with the previous static methods of testing elastic properties of roadways, thereby enabling the construction personnel to compare the results of the present method with those obtained through the use of the prior stationary testing processes.

Under the influence of the repetitive force, within the aforementioned range of magnitude and frequency, the structure will yield and return in synchronism with the application of the cyclic force, more or less according to the elastic properties of the structure. Accordingly, the structure will vibrate vertically in a manner which depends upon the nature and composition of the structure. Determination of such vibration will reflect the elastic properties of the structure.

The second step is to determine the deflection resulting from the applied force. As with the force, the motion sensing devices must be mechanically coupled to the structure. The coupling should be such that it passes the fundamental frequency of the deflections and preferably does not pass any other frequencies, particularly higher frequencies.

The deflections are normally determined at a point near the place where the force is applied. Doing so provides a general indication of the strength of the structure under test. However, as previously mentioned, while the deflections of two structures may be the same close to the point of the application of the force, the deflections of the two structures may differ at a distance from the point of application. Therefore, for various types of analysis, it is desirable to determine deflections at a plurality of positions each of which is spaced from the point of application. Measuring deflections at multiple positions will permit the determination of variations in the structure which cannot be determined by having only a single measuring position. For certain analyses, it may be desired to determine the shape of the bowl of deflection in which case it is desirable to have at least three stations of motion sensing positioned at various distances from the point of application of the force.

The deflection determining step has two aspects. First the resulting deflections of the structure are sensed and then the signals from the sensing device are processed to provide an indication or record of the deflections.

After the deflections have been sensed, the signals coming from the motion sensing device are processed. The signals are filtered so that the remaining signals consist principally of the fundamental frequency components with the incoherent noises also being eliminated. It is also desirable to provide filtering facilities such that any force changes that result from speed changes are properly compensated for. The signals are then rectified and integrated to deliver an intelligible signal to an indicator or recorder.

The indicated or recorded amplitude of deflections will reflect the amount of the deflections resulting from the applied force, that is, units of deflections per unit of applied force. The raw data will be directly useful to construction personnel in evaluating the structure traversed. The construction personnel may also desire to extrapolate the data to obtain other information. For example, from a practical standpoint, the applied force will not anywhere near approach the load to which a structure in the construction field is designed to withstand. Therefore, the data may be extrapolated to reflect deflections under loads normally encountered in the construction field. On the other hand, the data may also be extrapolated to determine the maximum load which the structure can support without failing. Accordingly, as previously mentioned, it is desirable to use a known force and maintain it constant throughout testing operations.

With the present invention, it is possible in an expeditious manner to ascertain the elastic properties of a structure, the amplitude of the deflections being indicative of compliance of the structure.

Reference will now be had to the drawings wherein the same reference character will be used throughout the several views to indicate the same item.

FIGURE 1 illustrates diagrammatically a preferred embodiment of the present invention where it can be seen that the dynamic deflection determination device 10 is comprised essentially of a roadway trailer 12 for transporting the device to the structure to be tested, a force applying assembly 14 for applying a cyclic repetitive force to the structure, an array of motion sensing devices 16 for detecting the deflections resulting from the application of the force, and instrumentation 18 for indicating the deflections detected by the motion detection devices 16.

The roadway trailer 12 is designed for easy transport along the highways. It is formed of a hollow rectangular frame 22 having two coaxial road wheels 20 attached along the sides of the frame 22. A tow-bar 24, which is provided with end means 25 designed for attachment to a regular ball-joint trailer hitch 26 contained on a towing vehicle 28 which may be any common motor vehicle capable of towing a trailer, extends from one end of the frame 22. The force applying assembly 14 is pivotally contained within the frame 22. The trailer 12 is so designed that a cover may be placed over the operating mechanism.

The force applying assembly 14 which is carried in the road trailer 12 is comprised of a force generating means 30 and a pair of mechanical coupling members 32-32 mounted on a tiltable frame 34 which is pivotally mounted in the frame 22 at journals 36—36 located along the sides of the frame 22. The force applying assembly 14 is horizontally contained in the frame 22 when the device is in roadway condition and is moved to a substantially vertical position when the device is in an operating condition.

The portion of the frame 34 which contains the mechanical coupling members 32—32 is longer than the height that the frame 22 of the trailer 12 is above the surface of the structure. As can be seen in FIGURE 1, two hydraulic cylinders 44 having piston rods 46 are connected to portions of the frame 34 containing the mechanical coupling members 32. A pump 48 driven by an electric motor 50 provides fluid to the hydraulic cylinders 44 to move the pistons 46 in and out. Movement of the pistons 46 cause the frame 34 to tilt about the journals 36 moving the force applying means from the horizontal to substantially vertical position. As will be explained subsequently, the control for the motor 50 is in a control unit 52 near the driver's seat of the towing vehicle.

The movement of the frame 34 from the horizontal position to the vertical position lifts the wheels 20 of the trailer 12 from contact with the surface of the structure. When the force applying assembly 14 is in the vertical position, the force generated by the force generator 30 is transmitted through the mechanical coupling members 32—32 to the surface into the structure.

The force applying assembly 14 is so designed that the center of gravity of the road trailer 12, when the force assembly 14 is in the horizontal road position, is forward of the road wheels 20 so that there will be a net downward force at the ball-joint trailer hitch 26 facilitating road transport. The force applying assembly 14 is so journalled in relation to the trailer 12 that when the force applying assembly 14 is in the substantially vertical test position, the center of gravity will result in net zero reaction at the ball-joint trailer hitch 26, thereby eliminating the towing vehicle's suspension system from effecting the force applying system.

As can be seen, the force generating means 30 is formed of a pair of counter-rotating weighted members 38—38 such as flywheels, each of which has a portion removed therefrom to essentially cause the flywheels to be eccentrically weighted members. The flywheels 38 are driven by a motor 40 through a belt drive 42. The control for the motor 40 is in the control unit 52 located in the towing vehicle 28. The flywheels 38 are rotated in opposite directions at a speed of approximately 480 r.p.m. or 8 cycles per second. The amount of flywheel unbalance is chosen to produce a 1,000 pound peak-to-peak variation of force during each rotation of the flywheels at the proper speed. The system is so designed that the counter rotating flywheels 38—38 are started while the force applying assembly 14 is in a horizontal position thereby enabling a much smaller motor to be utilized to drive the force generating means 30.

As mentioned, the force generating means 30 and the mechanical coupling means 32 are mounted on the frame 34 which is pivotally mounted in the hollow frame 22 of the trailer 12. The mechanical coupling means are shown to be wheels and are so mounted in relation to the flywheels 38—38 that one of the mechanical coupling members 32 in directly positioned under each of the flywheels 38. The mechanical coupling members 32—32 are connected by rigid members 54 which transmit the force from the flywheels 38—38 through the mechanical coupling members 32—32 to the surface of the structure. Having a pair of coupling members 32—32 permits the device 10 to be stable with the use of the simple ball-joint trailer hitch 26.

Although the force applying means 14 is normally in a horizontal position for transport, the device may be transported a short distance from one testing position to another on the wheels 20 forming the force coupling members 32. If desired, the surface contacting area of the force coupling members 32 may be provided with a semi-elastic material to assure more uniform contact with the textural surface of the structure. Material such as polyurethane may be used for this purpose.

In order to detect deflections resulting from the application of the cyclic repetitive force, an array of motion sensing devices 16 is used. These motion sensing devices may be geophones which are mounted on a three-legged platform to detect displacement of the structure. The bases of commercial geophones are not adapted for making good contact with a textured surface such as a gravel construction site. Accordingly, to insure a good mechanical coupling between the surface of the structure and the geophone, the geophone is fastened to a platform which is provided with three sharply-pointed triangular legs 56 of such a height as to assure surface contact by the legs 56 and avoid contact of the platform with the textured surface. It has been generally found that legs approximately 1 inch in height will suffice for most surfaces.

In order that the geophones 16 can be remotely positioned on the surface of the structure and also withdrawn from contact for moving the deflection detection device 10 to the next location, the geophones 16 are suspended from a member 58 which extends along the length of the tow-bar 24. The geophones 16 are suspended from the member 58 by means of fabric straps 60 attached at selected positions along the length of the member 58. The member 58 is attached to the tow-bar 24 in such a way that it can be raised and lowered by a reversible electric motor which is controlled from the control unit 52. When the dynamic deflection determination device 10 is in the operating position, the member 58 is lowered sufficiently so that the geophones 16 are in contact with the surface of the structure and the straps 60 between the members 58 and the geophones 16 are slack so that such straps 60 will not restrain the movement of the geophones 16.

The geophones 16 detect the displacement of the structure resulting from the application of the force and convert such displacement into electrical signals which are proportional to the respective displacements. The electrical signals are carried by flexible electrical conductors which go to the control unit 52.

Figure 3:
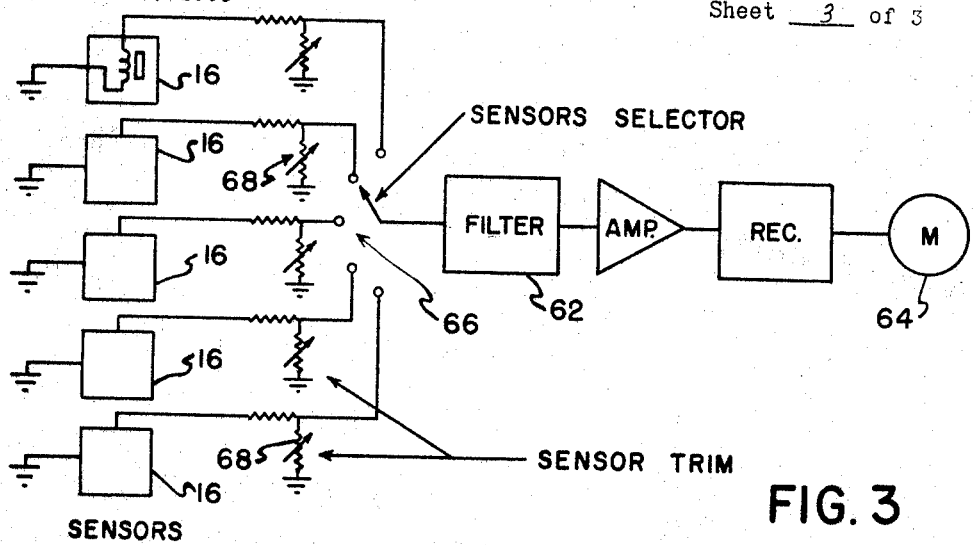
FIGURE 3 is a block schematic diagram of the instrumentation for determining the amplitude of the deflections.
Figure 4:
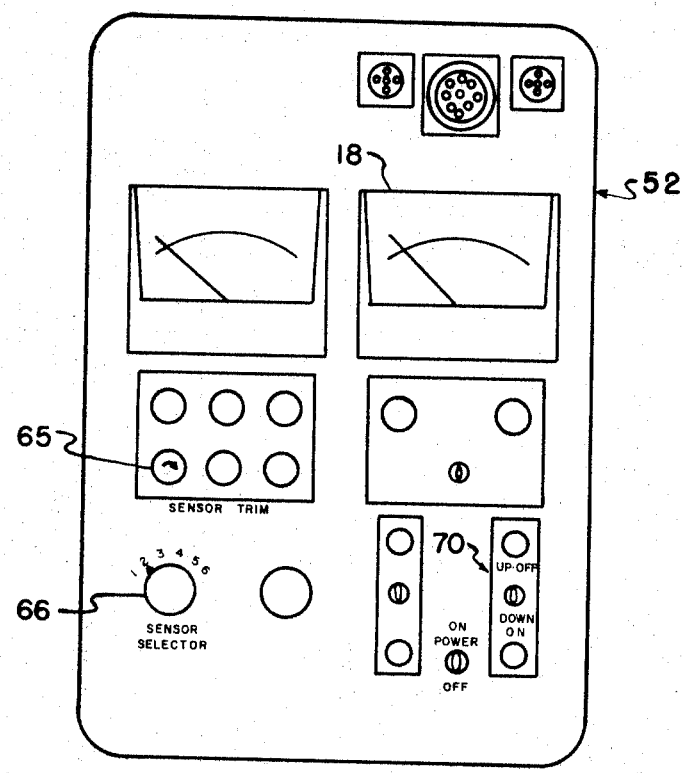
FIGURE 4 is a top plan view of the control unit for the dynamic deflection determination device.

The control unit 52 contains a multi-range transistorized AC voltmeter 64 which is scaled in milli-inches to indicate the deflections detected by the geophones 16. As is well known in the art and as can be seen in FIGURE 3, the voltmeter 64 contains an amplifier and rectifier and other familiar electronic components. Preceeding the voltmeter 64 is a filter 62 which is an $m$-divided pi section. The filter 62 suppresses electrical signal components which differ appreciably from the frequency of the cyclic force generator 30, especially frequencies substantially higher than the frequency of the cyclic force generator and also compensates the transmitted signal in such a manner that drifts of frequency of the cyclic force generator do not cause a variation in the observed indications. The frequency characteristic of conventional geophones, in the frequency range above the natural frequency of such geophones, varies as the first power of frequency when displacement is held constant. Hence, the geophones used in the preferred embodiment of the present invention have natural frequencies substantially below that of the applied cyclic force. Also, the force generated by the force generator tends to vary in proportion to frequency squared. Accordingly, it is necessary, for the sake of accuracy, to either maintain the frequency of the force generator very precisely or to provide an opposite effect elsewhere in the measuring system. In order to compensate for these two factors and to avoid the necessity for an expensive mechanism to maintain the force generator 30 at a precise constant frequency, the filter is designed to have a specific negative slope in its transmission characteristic in the vicinity of the operating frequency. Thus, the filter 62 is able to compensate for any slight variations in the operating frequency of the force generator 30. As mentioned, there is an array of several geophones 16 and accordingly preceding the filter 62 is a selector switch 66 which permits selection of the desired geophone 16. The control unit 52 also contains a number of sensitivity adjustment trimmers 68 so that the electrical output of each geophone 16 can be standarized. It is usually desirable to standardize each of the geophones daily. The trimmers then usually remain set for the rest of the day's operations.

As previously explained, the flywheels 38 of the force generator are driven by a small motor 40 which may be in the order of about $\frac{1}{10}$ horsepower. In order that the flywheels 38 can be so driven, it is necessary that they are started while the flywheels 38 are in a substantially horizontal position. The control unit 52 is provided with a control 70 for both the motor 50 which supplies fluid to the pump to raise and lower the force assembly 14 and also starts the motor 40 which drives the flywheels 38. Therefore, as soon as the motor 50 is energized to lower the force applying assembly 14, the motor 40 which drives the flywheels 38 of the force generator means 30 is also started. The control unit 52 is also provided with a speed control (not illustrated) for the motor 40 which drives the flywheels 38 and a tachometer 74 which indicates the speed of the flywheels 38. Therefore, the frequency of the force applied to the structure can be observed and regulated. While the speed of the force generator 30 can be adjusted by the operator, any slight variations in the speed are taken care of by the filter 62 as was previously described. The entire electrical system for the dynamic deflection determination device 10 is such that the 12 volt DC energy from the battery of the towing vehicle 28 may be utilized.

What is claimed is:
1. Apparatus for determining deflection properties of a structure comprising:
   a two-wheeled trailer designed for transport along a roadway, said trailer having a hollow frame;
   a force applying assembly comprised of;
     a pair of counter-rotating weighted members forming a cyclic force generating means,
     a pair of mechanical coupling members for coupling the force generating means to the structure in rigid force transmitting relationship to said force generating means;
   the force applying assembly being tiltably mounted within the hollow frame of the trailer being in a substantially horizontal position during transport and in a substantially vertical position in operating condition with the counter-rotating members being above the mechanical coupling members which are in weight-bearing contact with the structure;
   means to move the force applying assembly from one position to the other;
   at least one motion sensing device for detecting deflections of the structure resulting from the application of the cyclic force, said motion sensing device being mechanically coupled to the structure, and
   providing electrical signals indicative of the movement detected by the motion sensing device indicating means receiving the electrical signals from the motion sensing device and indicating characteristics of the deflections detected by the motion sensing means.

2. The apparatus specified in claim 1 characterized in that the length of mechanical coupling means portion of the force applying assembly is such that when the force applying assembly is in operating condition the wheels of the trailer are raised out of contact with the structure and the apparatus is supported by the mechanical coupling means.

3. The apparatus specified in claim 1 characterized in that the mechanical coupling means are formed of a pair of wheels.

4. The apparatus specified in claim 1 characterized in that the contact peripheral surface of the mechanical coupling means is provided with a layer of semi-elastic material which tends to provide a more uniform area contact on textured surfaces.

5. The apparatus specified in claim 1 characterized in that the motion sensing device is mounted on a base having three sharply-pointed contact means having a height in excess of normally-expected local surface irregularities of the structure.

6. The apparatus specified in claim 5 characterized in that there is an array of motion sensing devices suspended from a member attached to the trailer in such a manner that the motion sensing devices can be raised for transport and lowered into contact with the surface of the structure in operating condition and when in contact the motion sensing devices are isolated from receiving vibrations other than through the surface of the structure.

7. The apparatus specified in claim 6 characterized in the raising and lowering action is performed by a reversible electric motor which is remotely controlled.

8. The apparatus specified in claim 7 characterized in that the motion sensing devices are geophones having a resonant frequency substantially below the operating frequency of the cyclic force generating means.

9. The apparatus specified in claim 8 characterized in that the indicating means is provided with a filter which suppresses components with differ appreciably from the frequency of the cyclic force generator especially integral multiples thereof and compensates the transmitted signal in such a manner that drifts of frequency of the cyclic force generator do not cause a variation in the observed indications.

References Cited
UNITED STATES PATENTS

| | | | |
|---|---|---|---|
| 2,833,143 | 5/1958 | Wales | 73—67.1 |
| 2,910,134 | 10/1959 | Crawford et al. | 181—0.5 |
| 3,191,431 | 6/1965 | Schloss | 73—67.1 |
| 3,295,630 | 1/1967 | Kilmer | 181—0.5 |

RICHARD C. QUEISSER, Primary Examiner.
JOHN P. BEAUCHAMP, Assistant Examiner.

U.S. Cl. X.R.
73—67.1; 181—.5